United States Patent [19]

Shimomoto

[11] Patent Number: 5,500,584
[45] Date of Patent: Mar. 19, 1996

[54] BATTERY CHARGING METHOD AND APPARATUS USING INITIAL CHARGING STEP WITH GRADUALLY INCREASING CHARGING CURRENT, QUICK CHARGING STEP WITH LARGE CHARGING CURRENT AND FINAL CHARGING STEP WITH DECREASING CHARGING CURRENT

[75] Inventor: Kenkichi Shimomoto, Osaka, Japan

[73] Assignee: Kiyomi Hanashiro, Osaka, Japan

[21] Appl. No.: 129,153

[22] PCT Filed: Jul. 27, 1992

[86] PCT No.: PCT/JP92/00959

§ 371 Date: Nov. 3, 1993

§ 102(e) Date: Nov. 3, 1993

[87] PCT Pub. No.: WO93/16518

PCT Pub. Date: Aug. 19, 1993

[30] Foreign Application Priority Data

Feb. 17, 1992 [JP] Japan ..................... 4-79440
May 13, 1992 [JP] Japan ..................... 4-148121

[51] Int. Cl.$^6$ .......................... H01M 10/44; H01M 10/46
[52] U.S. Cl. ............................... 320/20; 320/24
[58] Field of Search ........................ 320/20, 22, 23, 320/24, 39, 40

[56] References Cited

U.S. PATENT DOCUMENTS 4,670,703  6/1987  Williams .................... 320/22

FOREIGN PATENT DOCUMENTS

| 54-7136 | 1/1979 | Japan. |
|---|---|---|
| 61-193380 | 8/1986 | Japan. |
| 1-160328 | 6/1989 | Japan. |
| 2-254932 | 10/1990 | Japan. |
| 4-12635 | 1/1992 | Japan. |

*Primary Examiner*—Peter S. Wong
*Assistant Examiner*—Edward Tso
*Attorney, Agent, or Firm*—Jordan and Hamburg

[57] ABSTRACT

A battery charging method for charging a battery such as a lead acid storage battery quickly, and a battery charging apparatus used in carrying out the battery charging method, includes an initial charging process between times 0 to t1, a quick charging process between times t1 to t2 and a final charging process between times t2 to t3, carried out stepwise and continuously. In the initial charging process, a charging current whose volume of electricity is increased gradually is applied. In the quick charging process, a charging current whose volume of electricity is larger than the initial charging process is applied intermittently to a battery while watching a voltage. In the final charging process, a charging current whose volume of electricity is reduced gradually is applied to the battery when the voltage has reached a charge-end voltage. Thereby, it is possible to charge in a very short time, and to penetrate the charging into electrodes without damaging the battery.

4 Claims, 7 Drawing Sheets

FIG. 5A SAW-TOOTH WAVE 1 TH

FIG. 5B COMPARISON OUTPUT 2

FIG. 5C CONTROL SIGNAL 3

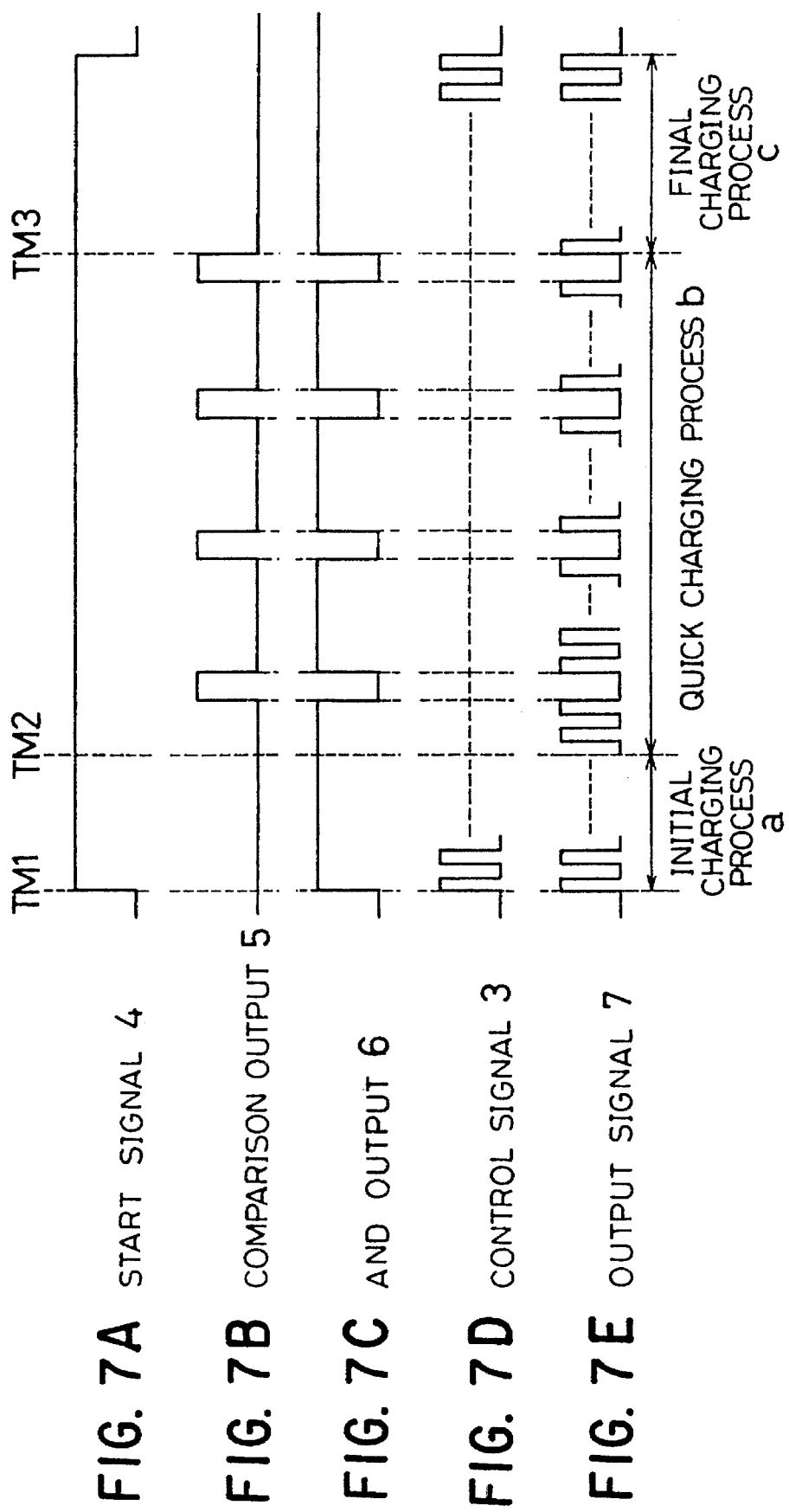

BATTERY CHARGING METHOD AND APPARATUS USING INITIAL CHARGING STEP WITH GRADUALLY INCREASING CHARGING CURRENT, QUICK CHARGING STEP WITH LARGE CHARGING CURRENT AND FINAL CHARGING STEP WITH DECREASING CHARGING CURRENT

TECHNICAL FIELD

The present invention relates to a battery charging method for charging a battery such as a lead acid storage battery quickly, and a battery charging apparatus used in carrying out said battery charging method.

TECHNICAL BACKGROUND

Conventionally, as a battery charging method, there are a constant-voltage charging method which applies a constant voltage to a battery for charging, and a constant-current charging method which applies a constant current continuously to the battery for charging. Though there are both merits and demerits in either of these methods, it is not easy to realize shortening of charging time considerably by any of existing methods.

In recent years, from a view point of environment protection, practical use of a so-called electromobile vehicle which uses the batteries as a driving source is strongly desired. For wide use of the electromobile, while it is necessary to shorten the battery charging time a great deal, the battery charging method which complies with this request sufficiently is still not developed at present.

Incidentally, a capacity of a battery is defined by an ampere-hour capacity (Ah) and an hour rate. For example, when the battery capacity of 10 Ah/10 hour rate is discharged at a current of 1 A, it can be used continuously for 10 hours. When this battery is discharged at a current of 4 A, while the continuous usable time is 2.5 hours by calculation, it takes, as a matter of fact, approximately 1.5 hours to reach the charge-end voltage. In the same way, when discharged at a current of 10 A, while the continuous usable time is 1 hour by calculation, a practical continuous usable time is approximately 35 minutes.

Similarly, this applies to charging, too. For example, when a battery of 10 Ah/10 hour rate capacity is charged at a constant current of 1 A for 10 hours, it reaches fully charged state. When it is charged at a constant current of 10 A, the chemical reaction in the battery proceeds faster than the calculation, and as a matter of fact, it approaches to the fully charged state by a half of the calculated time of one hour.

However, when the charging current is simply increased, it is liable to be overcharged and there is possibility of damaging electrodes of the battery. Moreover, there is a problem that only the surface of the electrodes is charged and the charging is not penetrated into the electrodes.

The present invention has been devised in view of the above-mentioned problems. It is the object, therefore, to provide a battery charging method and its apparatus which is able to charge in a very short item and to penetrate the charging into the electrodes without damaging a battery.

DISCLOSURE OF THE INVENTION

A battery charging method according to the present invention is characterized in that, an initial charging process for applying a charging current whose volume of electricity is increased gradually to start charging of a battery, a quick charging process for applying the charging current having the larger volume of electricity than the initial charging process intermittently to charge the battery while watching the battery terminal voltage, and a final charging process for applying the charging current whose volume of electricity is reduced gradually to finish charging of the battery, when the battery terminal voltage has reached a charge-end voltage, are carried out step-wise and continuously.

In a battery charging method claimed in claim 2, the battery defect is judged by watching the charging current in the initial charging process.

In a battery charging method claimed in claim 3, in the quick charging process, a continuous charging period during which the intermittent supply of charging current is continued, and a charging suspension period during which the intermittent supply of quick charging current is suspended, are repeated alternately till the battery terminal voltage reaches the charge-end voltage.

A battery charging apparatus according to the present invention comprises, a control switch provided in a charging circuit, a charging current detector, a terminal voltage detector of a battery, and a control unit which applies a control signal responsive to the charging steps to the control switch, in response to detected results of the charging current detector and the terminal voltage detector, to control the charging current step-wise, said control unit comprising: first signal generating means for generating a control signal for applying an initial stage charging current whose volume of electricity is increased gradually; second signal generating means for generating a control signal for applying a charging current having a volume of electricity larger than the initial stage charging current intermittently; third signal generating means for generating a control signal for applying a final stage charging current whose quantity of electricity is reduced gradually; first judging means for comparing the detected value by the charging current detector with a reference value to judge a battery defect; second jugging means for comparing the detected value by the terminal voltage detector with the charge-end voltage to judge that the terminal voltage of the battery has reached the charge-end voltage; first switching means for shifting the operation from the first signal generating means to the second signal generating means in response to the judging operation of the first judging means; and second switching means for shifting the operation from the second signal generating means to the third signal generating means in response to the judging operation of the second judging means.

In a battery charging apparatus claimed in claim 5, the control unit comprises, a period setting means which sets the continuous charging period during which the intermittent supply of charging current is continued, and the charging suspension period during which the intermittent supply of charging current is suspended, alternately till the battery terminal voltage reaches the charge-end voltage.

According to a battery charging method and a battery charging apparatus of the present invention, since a battery is charged by applying a charging current having a large volume of electricity intermittently after applying the initial stage charging current, charging can be finished in a short time and the charging is penetrated into electrodes without damaging the electrodes of the battery.

Since a terminal voltage of the battery is watched during the quick charging and the quick charging process is moved to the final charging process when the battery terminal voltage has reached the charge-end voltage, overcharging is prevented and the battery is not damaged.

In a battery charging method claimed in claim 2, since the battery defect is judged by watching the charging current in the initial charging process, a quick charging can be carried out only on an appropriate battery.

In a battery charging method and a battery charging apparatus claimed in claim 3 and claim 5, singe a charging suspension period during which the intermittent supply of the charging suspension period, charging penetrates more into the electrodes and spreads throughout the battery, thereby keeping the balance of charging between the electrodes.

PREFERRED FORM FOR THE EMBODIMENT OF THE INVENTION

Figure 1:
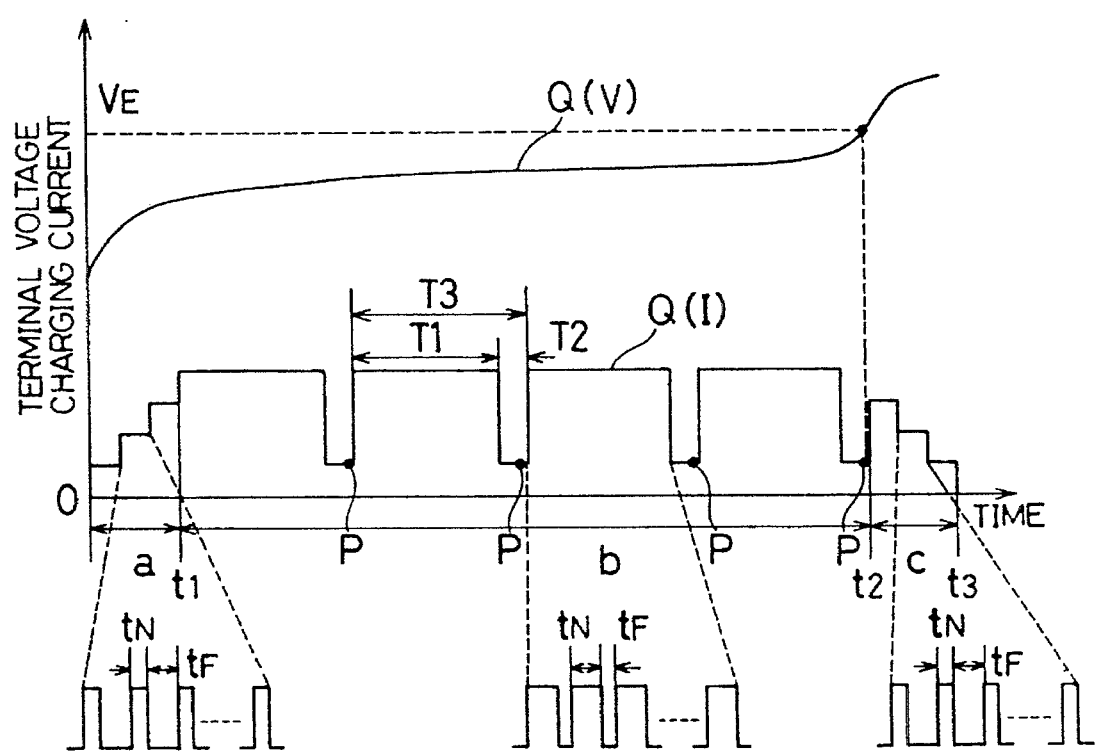
FIG. 1 is an explanatory view showing the principle of battery charging method of the present invention.

FIG. 1 shows the principle of battery charging method according to one embodiment of the present invention.

In the figure, the lapse of time is plotted along the abscissa. In this battery charging method, an initial charging period "a" between times "0" to "t1", a quick charging period "b" between times "t1" to "t2" and a final charging period "c" between times "t2" to "t3" are carried out step-wise and continuously.

A battery terminal voltage and charging current are plotted along the ordinate. In the figure, a character Q (V) shows variations of the battery terminal voltage at charging, and a character Q (I) shows variations of mean value (hereinafter referred to as "means current value") per unit time of the charging current at charging.

The initial charging process a is the process, whereby the charging current whose volume of electricity is increased gradually is applied to start charging of the battery. In this embodiment, the charging current is applied intermittently, and soon after starting the charging, a pulse width $t_N$ of the pulse-shaped charging current is set to a sufficiently small value, and as the time elapses, the pulse width $T_N$ relative to a pulse interval $t_F$ is set larger in a step-wise manner at every fixed time to increase the volume of electricity or the mean current value gradually.

In the initial charging process a, a battery defect is judged by watching the charging current, thus when the mean current value at the time point, when a fixed time (say 30 seconds) has elapsed, has reached a predetermined reference value, it is judged that the battery is normal and the charging process moves to the quick charging process b, and when the reference value is not reached, it is judged that the battery is abnormal and extraordinary measures such as stopping the charging are taken.

The following quick charging process b is the process, whereby the battery is charged by applying the charging current whose volume of electricity is larger than that of the initial charging process a intermittently while watching the battery terminal voltage. In this quick charging process b, the pulse width $t_F$ is set large, thereby the charging current is set to the larger volume of electricity (mean current value) than the initial charging process a.

A value (pulse height) of the charging current is set to two to four times of the battery capacity, that is, in the case of battery having the capacity of 10 Ah/10 hour rate, it is set to two to four times of 10 A.

Furthermore, in this quick charging process b, a continuous charging period T1 (say approximately 10 seconds) during which the intermittent supply of the charging current is continued, and a charging suspension period T2 (say approximately 2 seconds) during which the intermittent supply of the charging current is suspended are set alternately till the battery terminal voltage reaches a charge-end voltage $V_E$. The battery terminal voltage is measured during each of the charging suspension periods T2, preferably just before starting the continuous charging period T1. In the figure, a character P designates measuring time points of the battery terminal voltage.

The final charging process c is the process, whereby charging of the battery is finished by applying the charging current whose volume of electricity is reduced gradually, when the battery terminal voltage reaches the charge-end voltage $V_E$. In this embodiment, the volume of electricity (mean current value) is reduced gradually by applying the charging current intermittently, and setting the pulse width $t_N$ relative to the pulse interval $t_F$ of the charging current smaller in a step-wise manner at every fixed time as the time elapses.

Figure 2:
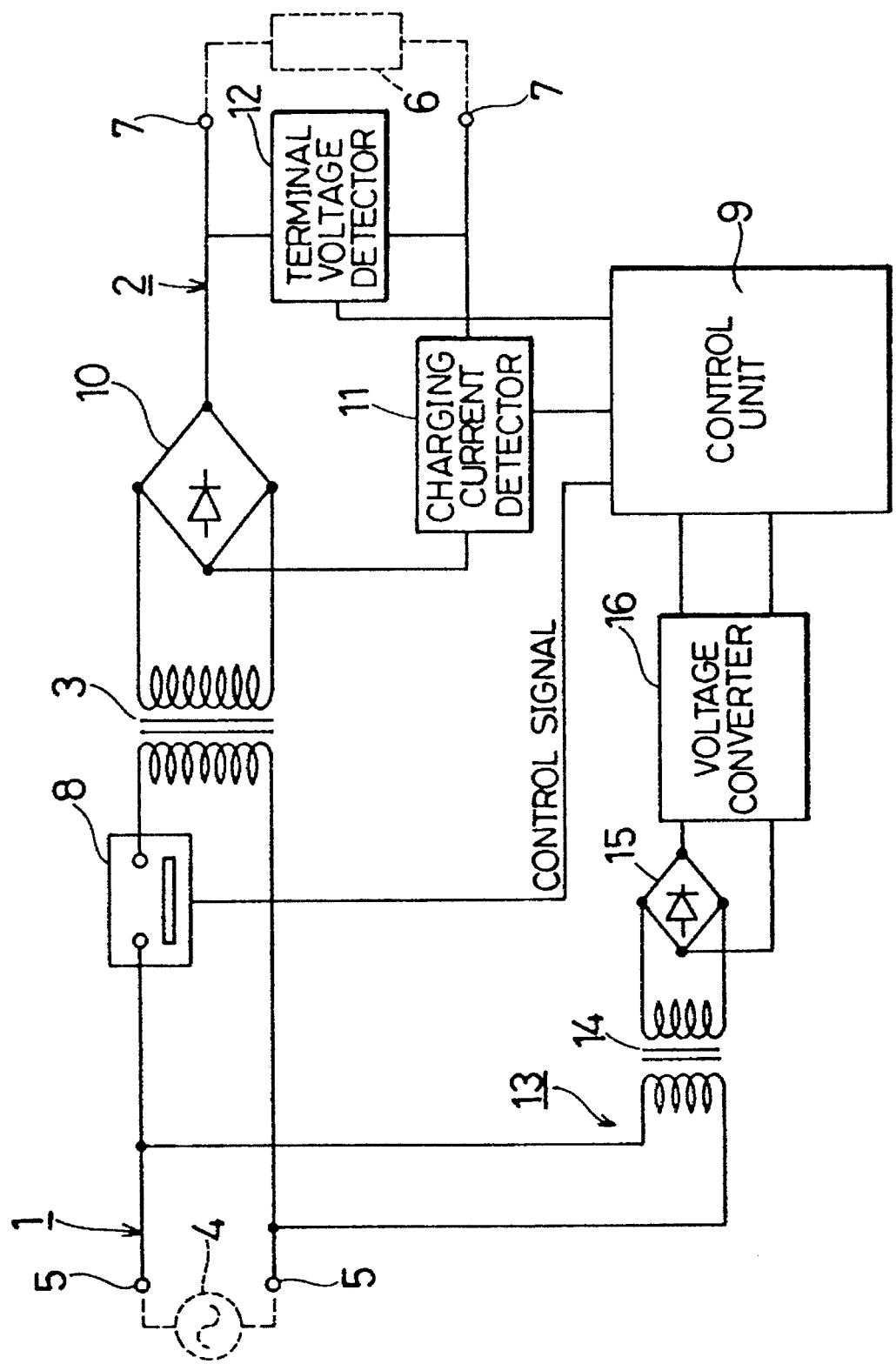
FIG. 2 is an electrical circuit diagram showing an example of circuit configuration of a battery charging apparatus according to the present invention.

FIG. 2 is an example of circuit configuration of a battery charging apparatus used in carrying out the abovementioned battery charging method.

In the battery charging apparatus shown in the figure, a charging circuit comprises a primary circuit 1 and a secondary circuit 2 connected by a transformer 3. Power input terminals 5, 5 connected to a single-phase A.C. power source 4 are provided in the primary circuit 1, and battery connecting terminals 7, 7 connected to a battery 6 are provided in the secondary circuit 2.

In the primary circuit 1, a control switch 8 consisting of a semiconductor switch such as SSR is provided. The control switch 8 operates to turn on and off by a control signal given from a control unit 9, and the timing of on-off operation against the control signal input is selected automatically by a zero-cross point of the A.C. input.

In the secondary circuit 2, a rectifier 10 which performs all-wave rectification of a secondary output of the transformer 3, a charging current detector 11 for detecting the charging current flowing through the secondary circuit 2 and a terminal voltage detector 12 for detecting the terminal voltage of the battery 6 are provided. Detected values by the charging current detector 11 and the terminal voltage detector 12 are taken into the control unit 9.

In the figure, numeral 13 designates a power circuit for supplying a D.C. voltage necessary for the operation of the control unit 9, and including a transformer 14, a rectifier 15 and a voltage converter 16.

Figure 3:
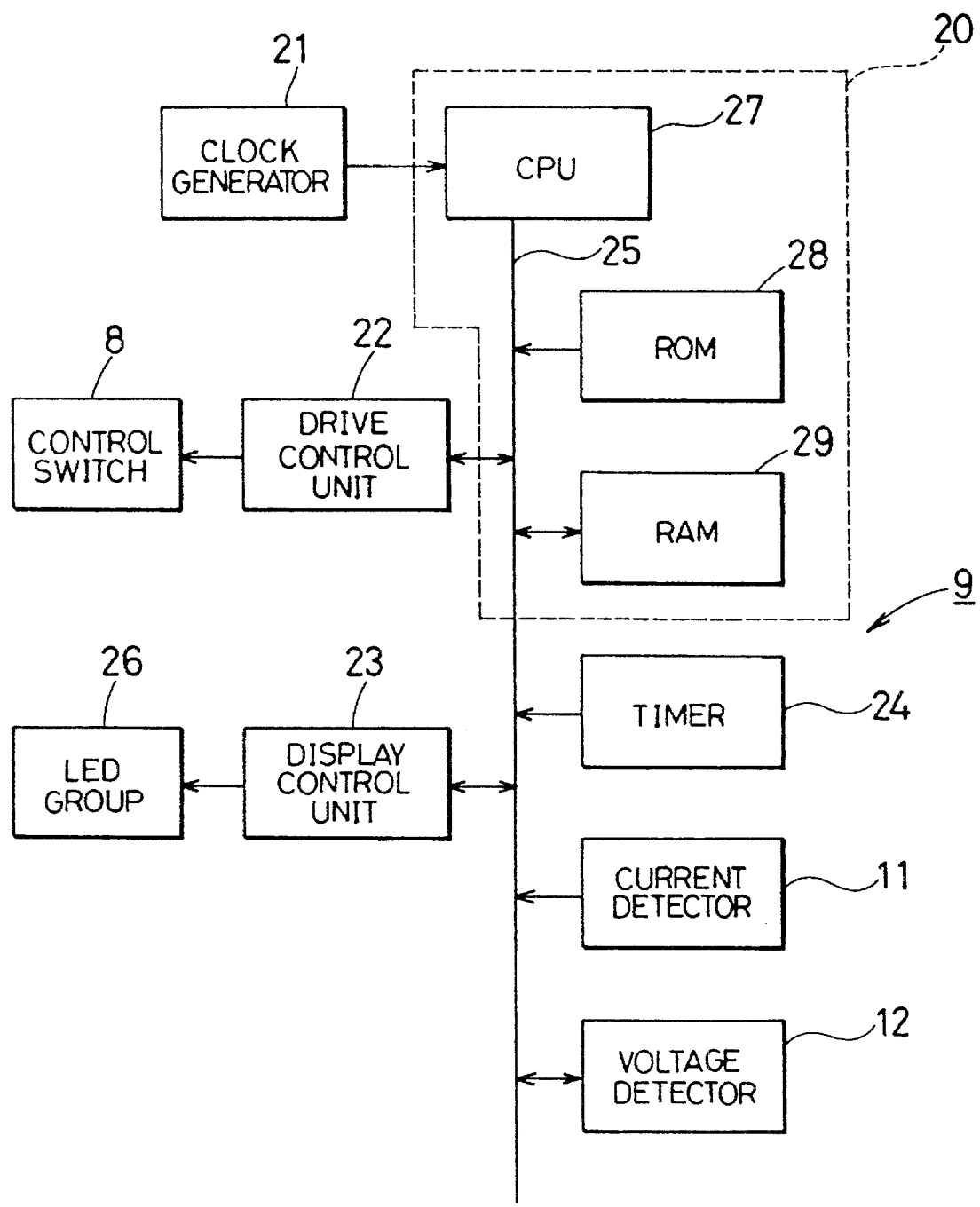
FIG. 3 is a block diagram showing a schematic configuration of a control unit.

FIG. 3 is a block diagram showing a schematic configuration of the control unit 9.

In the control unit 9, an operation control unit 20, a clock generator 21, a drive control unit 22, a display control unit 23 and a timer 24 are included. The control switch 8 is connected to the drive control unit 22 and an LED group 26 is connected to the display control unit 23, The LED group 26 consists of a plurality of LEDs, which are illuminated and indicate operating states of the battery charging apparatus under the control of display control unit 23, The operation control unit 20 is constituted by a microcomputer, and includes a CPU 27 which is the main body of control and operation, a ROM 28 storing programs and a RAM 29 which reads and writes data. To the CPU 27, the charging current detector 11 and the terminal voltage detector 12 are connected via a bus 25, besides the drive control unit 22, display control unit 2S and timer 24.

Figure 4:
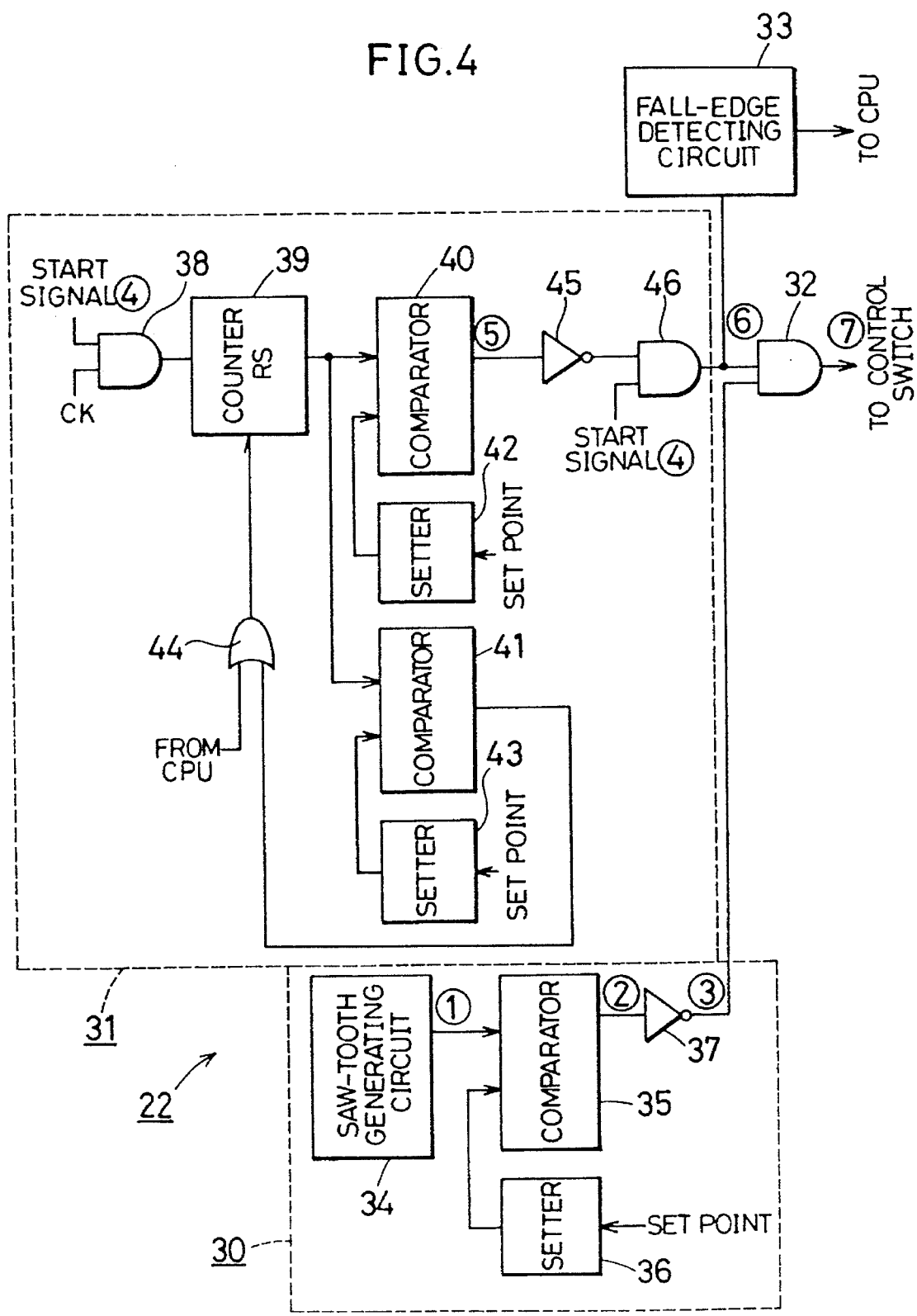
FIG. 4 is a block diagram showing a specific example of a drive control unit, FIGS. 5(1)–5(3) explanatory views showing the principle of generation of a control signal in a control signal generating unit.

FIG. 4 shows a specific circuit configuration of the drive control unit 22, consisting of a control signal generating unit 30, a period setting unit 31, a gate circuit unit 32 and a fall-edge detecting circuit 33, The control signal generating unit 30 is for generating a control signal which controls the on-off operation of the control switch 8, and includes a saw-tooth wave generating circuit 34, a comparator 35, a setter 36 and an inversion circuit 37.

Figure 5:
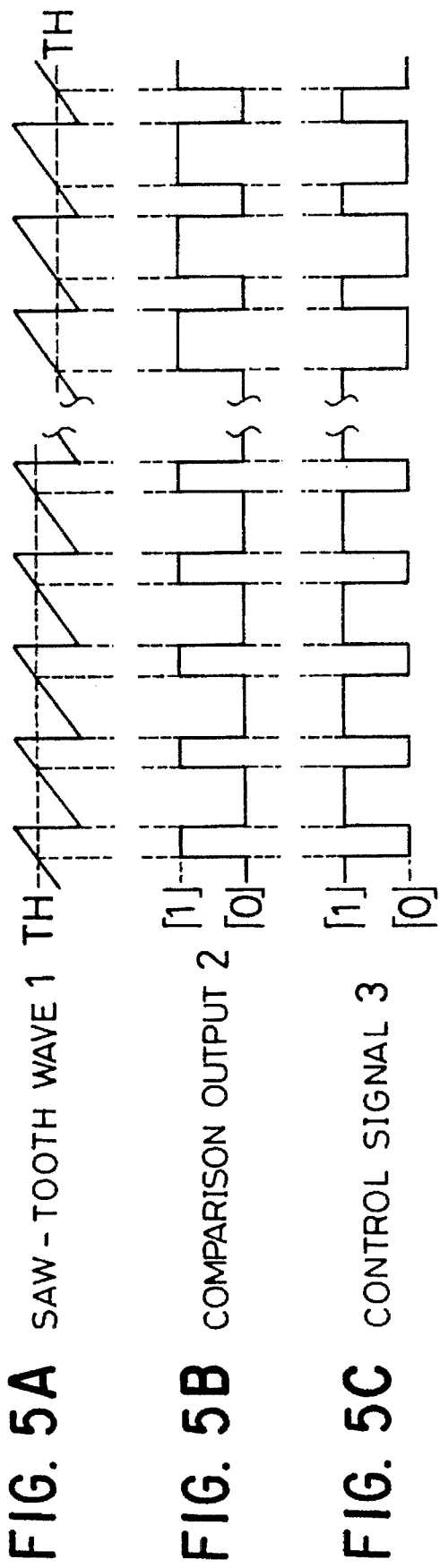

FIG. 5 shows the generating principle of the control signal in the control signal generating unit 30.

FIG. 5 (1) is a saw-tooth wave [1] generated by the saw-tooth wave generating circuit 34. The comparator 35 compares the size of a voltage level of the saw-tooth wave [1] with a set point TH set in the setter 36. When the voltage level of the saw-tooth wave [1] is above the set point TH, as shown in FIG. 5(2), an output level of the comparator 35 becomes "1", and when below the set point TH, the output level becomes "0". Comparison output [2] of the comparator 35 is inverted by the inversion circuit 37, and as the inversion output, a control signal [3] shown in FIG. 5 (3) is obtained.

When the set point TH is set to a high level, a pulse width of the control signal [3] becomes larger than a pulse interval. Thus, in the quick charging process b, the charging current having a large volume of electricity is obtained by setting such a high level set point TH to generate the control signal [3].

When the set point TH is set to a low level, the pulse width of the control signal [3] becomes smaller than the pulse interval. Thus, in the initial charging process a and the final charging process c, the charging current whose volume of electricity increases and decreases gradually is obtained by setting such a low level set point TH variably and in step-wise at every fixed time to generate the control signal [3].

Returning to FIG. 4, the period setting unit 31 is for setting a period during which the control signal [3] is given to the control switch 8, and includes a counter 39 to which a clock signal CK is given via an AND circuit 38, first and second comparators 40, 41 which compare the count value of the counter 39 with set points set in the setters 42, 43. The clock signal CK is given to the AND circuit 38 from the clock generator 21, and the AND circuit 38 outputs the clock signal CK to the counter 39 when a starting signal is given from the CPU 27.

In the initial charging process a and the final charging process c, any values which are sufficiently large are set in the setters 42, 43, and in the quick charging process b, a value corresponding to the continuous charging time T1 is set in one setter 42, and a value corresponding to a sum of the continuous charging time T1 and the charging suspension time T2, or a one cycle length T3 is set in the other setter 43.

The first and second comparators 40, 41 are that, when the count value of the counter 39 reaches the set points of respective setters 42, 43, the comparison values become "1", the comparison output of the second comparator 41 is given to the counter 39 as a reset signal via an OR circuit 44.

The comparison output of the first comparator 40 is given to an AND circuit 46 together with the starting signal via the inversion circuit 45. By the output of the AND circuit 46, the gate circuit unit 32 is controlled to open and close, and the control signal [3] is given to the control switch 8 as the output signal when the gate circuit is in open-state.

The fall-edge detecting circuit 33 detects the fall output of the AND circuit 45 and outputs an edge detecting signal to the CPU 27. When the CPU 27 receives the edge detecting signal, takes in the detected value of the terminal voltage detector 12 at an adequate timing.

Figure 6:
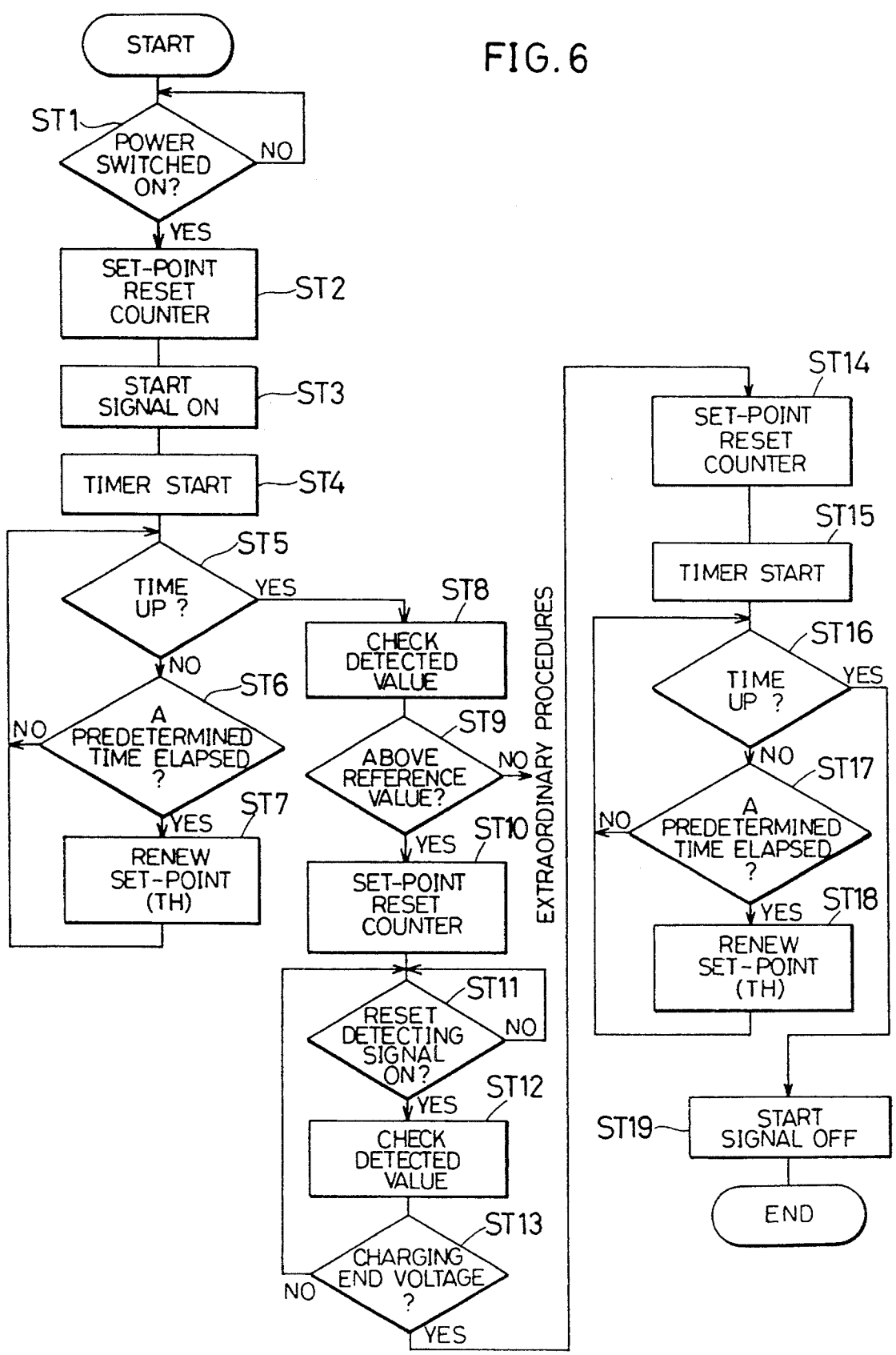
FIG. 6 is a flow chart showing control procedures by a operation control unit, and FIGS. 7(1)–7(5) are time charts showing the circuit operation of a drive control unit.

FIG. 6 shows control procedures of the operation control unit 20, and FIG. 7 shows time charts of the drive control unit 22.

In FIG. 6, Step 1 (shown as "STi" in the figure) to Step 9 show the control procedures in the initial charging process, Step 10 to Step 13 show the control procedures in the quick charging process, and Step 14 to Step 19 show the control procedures in the final charging process. In the following, the operation of the battery charging apparatus is particularly described according to FIG. 6 and FIG. 7.

First, in Step 1 (shown as "STi" in the figure) of FIG. 6, the CPU 27 judges whether the power is switched on or not, when it is judged "YES", after setting an initial set point TH in the initial charging process in the setter 36 of the control signal generating unit 30, and setting any sufficiently large values in the setters 42, 43 of the period setting unit 31, the CPU turns on the starting signal [4] (refer to FIG. 7 (1)), and starts the timer 24 (Step 2 to Step 4 ).

In FIG. 7, reference character TM1 indicates a start timing of the initial charging process a, thereby the control signal generating unit S0 generates the control signal [3] (refer to FIG. 7 (4)) having the pulse width responsive to the initial set point TH. Though the counter 39 of the period setting unit 31 starts counting operation, since its counted value is smaller than the set points of the setters 42, 43. A comparison output [5] (refer to FIG. 7 (2)) of the first comparator 41 remains as "0", and an AND output [6] (refer to FIG. 7 (3)) of the AND circuit 46 is "1". Thus, the gate circuit unit 32 is maintained in open-state, and in the initial charging process a, the control signal [3] passes through the gate circuit 32 as it is and is given to the control switch 8 as an output signal [7] ( refer to FIG. 7 (5)) .

In the timer 24, the duration time (say 30 seconds) of the initial charging process a is set, and in the next Step 5, it is judged whether the time of the timer 24 is up, and in the following Step 6, it is judged whether a predetermined time has elapsed.

When a predetermined time has elapsed, it is judged "YES" in Step 6 and the CPU 27 proceeds to Step 7 to set the next set point TH in the setter 36 of the control signal generating unit 30, and generates the control signal [3] having the pulse width responsive to the set point TH.

By renewing the set point TH at every elapse of predetermined time, and generating the control signal having the pulse width responsive to the set point TH until the time of the timer 24 is up, the charging current whose quantity of electricity is increased gradually is obtained.

When the time of the timer 24 is up, it is judged "YES" in Step 5 and the CPU 27 proceeds to Step 8 to take in the detected value by the charging current detector 11, and compares with a predetermined reference value. When the detected value is above the reference value, though it is judged "YES" in Step 9 and the CPU 27 moves to the quick charging process b below Step 10, when the detected value is below the reference value, the CPU 27 judges the battery defect and performs extraordinary procedures such as suspension of charging.

In the first Step 10 of the quick charging process by the CPU 27 sets a predetermined set point TH in the setter 86 of the control signal generating unit 30, sets a value corresponding to the continuous charging time T1 in one setter 42 of the period setting unit 31, sets a value corresponding to one cycle length T3 in the other setter 43, and resets the counter 89 of the period setting unit 31.

In FIG. 7, reference character TM2 indicates a start timing of the quick charging process b, thereby the control signal generating unit 30 generates the control signal [3] having the pulse width responsive to the set point TH. Though the counter 39 of the period setting unit 31 continues the counting operation, until the counted value reaches the set point of the setter 42 corresponding to the continuous charging period, the comparison output [5] of the first comparator 40 is "0", and the AND output [6] of the AND circuit 46 is "1" (refer to FIGS. 7 (2), (3)). Thus, the gate circuit unit 32 is set to open-state, and the control signal [3] passes through the gate circuit unit 32 as it is and is given to the control switch 8 as the output signal [7] (refer to FIG. 7 (5)).

When the count value of the counter 39 becomes larger than the set point of the setter 42, the charging suspension period T2 is extended, the comparison output [5] of the first comparator 40 becomes "1" and the AND output [6] of the AND circuit 46 becomes "0" (refer to FIGS. 7 (2), (3)). Thereby, the gate circuit unit 32 is set to close-state, the control signal [3] is interrupted by the gate circuit unit 32 and the output signal [7] is "0" (refer to FIGS. 7 (4), (5)).

When the AND output [6] of the AND circuit 46 falls from "1" to "0", it is detected by the fall-edge detecting circuit 33 and the edge detecting signal is outputted to the CPU 27. Thereby, it is judged "YES" in Step 11, and the CPU 27 takes in the detected value by the terminal voltage detector 12 to compare with the charging end voltage $V_E$ (Step 12). When the detected value has reached the charging end voltage $V_E$, though it is judged "YES" in Step 13 and the CPU 27 moves to the final charging process c below Step 14, when the detected value is smaller than the charge-end voltage $V_E$, the CPU 27 returns to Step 11 to continue the quick charging process b and stands by for the next edge detecting signal.

When the count value of the counter 89 becomes larger than the set point of the setter 4S in the quick charging process b, the comparison output of the second comparator 41 becomes "1", and by this comparison output the counter 39 is reset. As a result, the count value of the counter 39 becomes smaller than the set point of the setter 42, the comparison output of the comparator 40 is changed to "0" and the AND output [6] of the AND circuit 46 becomes "1" (refer to FIGS. 7 (2), (3)). Thereby, the gate circuit unit 32 is set to open-state, and the control signal [3] passes through the gate circuit unit 32 as it is and is given to the control switch 8 as the output signal [7], thus returning to the continuous charging period T1 from the charging suspension period T2 (refer to FIG. 7 (5)).

While such operations are repetitively executed, when the detected value by the terminal voltage detector 12 reaches the charge-end voltage $V_E$, it is judged "YES" in Step 13, and the CPU 27 moves to the final charging process c below Step 14.

In the first Step 14 of the final charging process c, after setting a first set point TH in the final charging process c in the setter 36 of the control signal generating unit 30, and setting any sufficiently large value in the setters 42, 4S of the period setting unit 31, the CPU 27 starts the timer 24 (steps 14, 15).

In FIG. 7, reference character TM3 indicates the start timing of the final charging process c, thereby the control signal generating unit 30 generates the control signal [3] having the pulse width responsive to the first set point TH (refer to FIG. 7 (4)). Though the counter 39 of the period setting unit 31 starts a counting operation, since the count value is smaller than the set points of the setters 42, 43 the comparison output [5] (refer to FIG. 7 (2)) of the first comparator 41 remains as "0", and the AND output [6] (refer to FIG. 7 (3)) of the AND circuit 46 is "1". Thus, the gate circuit unit 32 is maintained in open-state, and in the final charging process c, the control signal [3] passes through the gate circuit unit 32 as it is and is given to the control switch 8 as the output signal [7] (refer to FIG. 7 (5)).

A predetermined duration time of the final charging process c is set in the timer 24, and in Step 16 it is judged whether the time of the timer 24 is up, and in the following Step 17, it is judged whether a predetermined time has elapsed.

When the predetermined time has elapsed, it is judged "YES" in Step 17 and the CPU 27 proceeds to Step 18 to set a next set point TH in the setter $6 of the control signal generating unit 30, and generates the control signal [3] having the pulse width responsive to the set point TH.

By generating the control signal having the pulse width responsive to the set point TH at every elapse of predetermined time as renewing the set point TH until the time of the timer 24 is up, the charging current whose volume of electricity is reduced gradually is obtained.

When the time of the timer 24 is up, it is judged "YES" in Step 16 and the CPU 27 proceeds to Step 19 to turn off the start signal [4] to finish charging.

In the above-mentioned embodiment, though the charging current is applied intermittently in both the initial charging process a and the final charging process c, it is not limited thereto, and the charging current may be applied continuously.

What is claimed is:

1. A battery charging method comprising the steps of:
    an initial charging step of applying a first gradually increasing charging current, to start charging of a battery,
    a monitoring step of monitoring the charging current in the initial charging step after elapse of a predetermined charging time, to provide a detected value,
    a comparing step of comparing said detected value with a predetermined value,
    a quick charging step of thereafter intermittently applying a second charging current which is larger than the first charging current, while monitoring a terminal voltage of the battery, to charge the battery to a charge-end voltage, when said detected value is greater than said predetermined value in said comparing step, said quick charging step including the steps alternately repeating:

a charging period during which an intermittent supply of the second charging current is continued, and a charging suspension period during which the intermittent supply of the second charging current is suspended, until the terminal voltage of the battery reaches the charge-end voltage, and a final charging step of thereafter applying a gradually decreasing charging current, to finish charging of the battery.

2. A battery charging apparatus comprising:

a charging circuit for causing a charging current to flow to a battery;

a control switch connected to said charging circuit for selectively passing and cutting off the charging current flowing through said charging circuit to the battery;

a charging current detector connected to said charging circuit for detecting the charging current flowing through said charging circuit;

a terminal voltage detector connected to the battery for detecting a terminal voltage of the battery; and a control unit which controls current supply to the charging circuit by supplying control signals to the control switch in response to detection by the charging current detector and the terminal voltage detector, said control unit including:

first signal generating means for controlling said control switch to cause a first gradually increasing charging current, to be supplied through the charging circuit to the battery, to start charging of the battery, first judging means for comparing a value of said first charging current detected by the charging current detector with a reference value to determine a defect of the battery, second signal generating means for controlling said control switch to intermittently cause a second charging current larger than the first charging current to be supplied through the charging circuit to the battery when the first gradually increasing charging current is greater than said reference value after elapse of a predetermined amount of time, to charge the battery to a charge-end voltage, period setting means connected with the control switch for alternately setting a charging period during which the intermittent supply of said second charging current is continued, and a charging suspension period during which the intermittent supply of said second charging current is suspended, until the terminal voltage of the battery reaches the charge-end voltage, and third signal generating means for controlling said control switch to cause a third gradually decreasing charging current, to be supplied through the charging circuit to the battery after said charge-end voltage has been reached by said second charging current, to finish charging of the battery.

3. A battery charging apparatus according to claim 2, further comprising switching means for controlling said first through third signal generating means to shift the operation from the first signal generating means to the second signal generating means when the first charging current detected by said charging current detector reaches a predetermined value, and for switching the operation from the second signal generating means to the third signal generating means when the detected voltage by said terminal voltage detector reaches said charge-end voltage.

4. A battery charging apparatus according to claim 3, further comprising:

second judging means for comparing a value of said terminal voltage detected by the terminal voltage detector with said charging-end voltage to determine that the terminal voltage of the battery has reached the charge-end voltage, and said switching means controls said first through third signal generating means to shift the operation from the first signal generating means to the second signal generating means in response to said first judging means, and switches the operation from the second signal generating means to the third signal generating means in response to said second judging means.

* * * * *